United States Patent
Toda

(10) Patent No.: US 9,703,300 B2
(45) Date of Patent: Jul. 11, 2017

(54) TEMPERATURE REGULATION CIRCUIT

(71) Applicant: FUJITSU LIMITED, Kawasaki-shi, Kanagawa (JP)

(72) Inventor: Asako Toda, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 509 days.

(21) Appl. No.: 14/251,184

(22) Filed: Apr. 11, 2014

(65) Prior Publication Data

US 2015/0293542 A1    Oct. 15, 2015

(51) Int. Cl.
| | | |
|---|---|---|
| *H05B 1/02* | (2006.01) | |
| *G05D 23/19* | (2006.01) | |
| *G05D 23/27* | (2006.01) | |

(52) U.S. Cl.
CPC ......... *G05D 23/1919* (2013.01); *G05D 23/27* (2013.01)

(58) Field of Classification Search
CPC .............. G05D 23/1919; G05D 23/27; G05D 23/1927; H05B 1/02; H05B 3/12; H05B 2203/019; H05B 2203/02
USPC .......................... 219/209, 210, 494, 501, 497
See application file for complete search history.

(56) References Cited

U.S. PATENT DOCUMENTS

| | | | | |
|---|---|---|---|---|
| 4,507,546 A | * | 3/1985 | Fortune ................. | G05D 13/62 219/483 |
| 6,531,911 B1 | * | 3/2003 | Hsu ....................... | G01K 7/015 257/E23.08 |
| 7,204,638 B2 | * | 4/2007 | Hsu ....................... | G01K 15/00 327/513 |
| 7,977,622 B2 | | 7/2011 | McLaren et al. | |
| 8,179,935 B2 | | 5/2012 | Santori et al. | |
| 2011/0057718 A1 | * | 3/2011 | Snoeij ..................... | H03F 1/30 327/512 |
| 2015/0116027 A1 | * | 4/2015 | Venkiteswaran ....... | G05F 1/463 327/513 |
| 2015/0268103 A1 | * | 9/2015 | Wu ......................... | G01K 1/024 374/1 |

* cited by examiner

*Primary Examiner* — Mark Paschall
(74) *Attorney, Agent, or Firm* — Maschoff Brennan

(57) ABSTRACT

A temperature regulation system configured to regulate a temperature of the device may include first and second temperature-dependent current sources that are configured to generate first and second currents, respectively. The system may also include amplifiers configured to apply respective first and second amplification factors to the respective first and second currents to generate respective first and second intermediate currents. The system may also include a heater configured to generate heat based on the first and second intermediate currents and positioned such that the generated heat affects the device. Additionally, the system may include a controller configured to adjust the first and second amplification factors such that changes in the first and second currents, resulting from changes in temperature of the first and second current sources, result in changes to the heat generated by the heater to maintain an approximately equal temperature of the device.

13 Claims, 6 Drawing Sheets

TEMPERATURE REGULATION CIRCUIT

FIELD

The embodiments discussed herein are related to device temperature adjustment.

BACKGROUND

Electromagnetic beams, such as laser beams, are frequently used to transmit digital data, for example, in fiber-optic systems for long-distance telephone and internet communication. Consequently, optical technology plays a significant role in modern telecommunications and data communication. Examples of optical components used in such systems include optical or electromagnetic radiation sources such as light-emitting diodes and lasers, waveguides, fiber optics, lenses and other optics, photo-detectors and other optical sensors, optically-sensitive semiconductors, optical modulators, and others.

Systems making use of optical components often rely upon the precise manipulation of electromagnetic beams at specific wavelengths to accomplish a desired task. The wavelength of an electromagnetic beam may be disturbed by changes in a system, such as changes in electromagnetic energy, voltages and currents, temperature, among other changes. These changes may change the wavelength of the electromagnetic beams and render the system inoperable.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a temperature regulation system is disclosed that may be configured to regulate a temperature of the device. The system may include first and second temperature dependent current sources that are configured to generate first and second currents, respectively. The system may also include a first amplifier configured to apply a first amplification factor to the first current to generate a first intermediate current and a second amplifier configured to apply a second amplification factor to the second current to generate a second intermediate current. The system may also include a heater configured to generate heat based on the first and second intermediate currents and positioned such that the generated heat affects the device. Additionally, the system may also include a controller configured to adjust the first and second amplification factors such that changes in the first and second currents, resulting from changes in temperature of the first and second current sources, result in changes to the heat generated by the heater to maintain an approximately equal temperature of the device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a temperature regulation system is disclosed that is configured to regulate a temperature of a device that is temperature dependent. The temperature-dependent device may be configured to generate an output, where a value of the output is dependent on the temperature of the device.

The temperature regulation system may include a first current source that temperature dependent and is configured to generate a first current that is positively proportional to temperature change and a second current source that is temperature dependent and is configured to generate a second current that is negatively proportional to temperature change. The first and second currents may be summed in the temperature regulation system and provided to a heater that generates heat that affects the temperature of the device. The temperature regulation system may also include a controller that is configured to control amplification factors applied to the first and second currents to control the current applied to the heater and thus control the generated heat and the temperature of the device.

The controller may be configured to select the amplification factors applied to the first and second currents such that an amount of the heat generated by the heater is effective to maintain an approximately equal or equal temperature of the device even when heat is applied to the device by other devices in proximity of the device. In particular, the controller may be configured to maintain the device at a temperature that is selected based on a desired value of the output of the device that is dependent on the temperature of the device.

Embodiments of the present invention will be explained with reference to the accompanying drawings.

Figure 1:
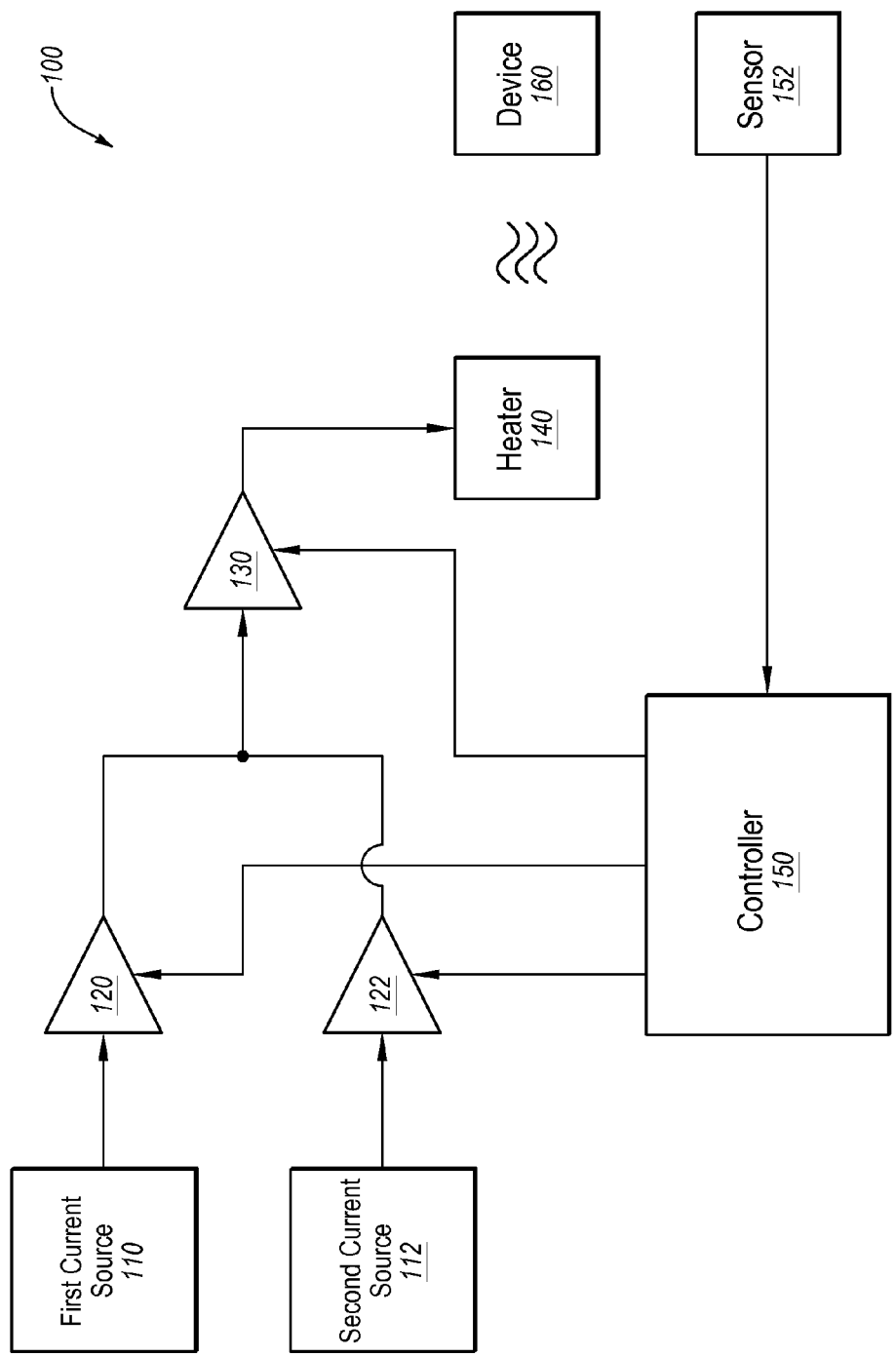
FIG. 1 illustrates an example temperature regulation system.

FIG. 1 illustrates an example temperature regulation system 100 (referred to hereinafter as "system 100"), arranged in accordance with at least one embodiment described herein. The system 100 includes a first current source 110, a second current source 112, a first amplifier 120, a second amplifier 122, a third amplifier 130, a heater 140, a controller 150, and a sensor 152. FIG. 1 also illustrates a device 160, the temperature of which the system 100 is configured to regulate.

The first current source 110 may be configured to generate a first current and to provide the first current to the first amplifier 120. The first current source 110 may be temperature dependent such that the first current is positively proportional to temperature change. For example, the first current may increase as the temperature of the first current source 110 increases and may decrease as the temperature of the first current source 110 decreases. In some embodiments, the first current source 110 may include a bipolar transistor or a complementary metal-oxide semiconductor (CMOS) transistor. Alternately or additionally, the first current source 110 may include a combination of multiple transistors of the same or different types alone or in combination with other passive or active circuit devices.

The second current source 112 may be configured to generate a second current and to provide the second current to the second amplifier 122. The second current source 112 may be temperature dependent such that the second current is negatively proportional to temperature change. For instance, the second current may decrease as the temperature of the second current source 112 increases and may increase as the temperature of the second current source 112 decreases. In some embodiments, the second current source 112 may include a bipolar transistor or a complementary metal-oxide semiconductor (CMOS) transistor. Alternately or additionally, the second current source 112 may include a combination of multiple transistors of the same or different types alone or in combination with other passive or active circuit devices.

The first amplifier 120 may be configured to receive the first current from the first current source 110 and to apply a first amplification factor to the first current to generate a first intermediate current. The first intermediate current may be provided to the third amplifier 130.

The first amplification factor applied by the first amplifier 120 may be one, less than one, or greater than one. The first amplifier 120 may be configured as a variable amplifier such that the first amplifier 120 may vary the first amplification factor applied to the first current. As a result, the magnitude of the first intermediate current may vary depending on the first amplification factor applied by the first amplifier 120. The magnitude of the first amplification factor of the first amplifier 120 may be controlled by the controller 150.

The second amplifier 122 may be configured to receive the second current from the second current source 112 and to apply a second amplification factor to the second current to generate a second intermediate current. The second intermediate current may be provided to the third amplifier 130. As a result, the third amplifier 130 may receive a sum of the first and second intermediate currents.

The second amplification factor applied by the second amplifier 122 may be one, less than one, or greater than one. The second amplifier may be configured as a variable amplifier such that the second amplifier 122 may vary the second amplification factor applied to the second current. As a result, the magnitude of the second intermediate current may vary depending on the second amplification factor applied by the second amplifier 122. The magnitude of the second amplification factor of the second amplifier 122 may be controlled by the controller 150.

The third amplifier 130 may be configured to receive the sum of the first and second intermediate currents from the first and second amplifiers 120 and 122. The third amplifier 130 may also be configured to apply a third amplification factor to the sum of the first and second intermediate currents to generate a heat current. The heat current may be provided to the heater 140.

The third amplification factor applied by the third amplifier 130 may be one, less than one, or greater than one. The third amplifier 130 may be configured as a variable amplifier such that the third amplifier 130 may vary the third amplification factor applied to the sum of the first and second intermediate currents. As a result, the magnitude of the heat current may vary depending on the third amplification factor applied by the third amplifier 130. The magnitude of the third amplification factor of the third amplifier 130 may be controlled by the controller 150.

The heater 140 may be configured to receive the heat current and to generate heat based on the heat current. For example, as the heat current increases the heater 140 may be configured to generate more heat and as the heat current decreases the heater 140 may be configured to generate less heat.

The heater 140 may be positioned in proximity to the device 160 such that the heat generated by the heater 140 may affect the temperature of the device 160. Thus, when the heater 140 generates more heat, the temperature of the device 160 may increase and when the heater 140 generates less heat, the temperature of the device 160 may decrease. In some embodiments, the heater 140 and the device 160 may be located with respect to each other such that the temperature of the device 160 is approximately equal or equal to the temperature near the heater 140. Alternately or additionally, the heater 140 and the device 160 may be located with respect to each other such that the temperature of the device 160 is not approximately equal to the temperature near the heater 140. For example, one or more different types of material may reside between the heater 140 and the device 160 such that the temperature near the heater 140 may be 1%, 5%, 10%, 15%, 20%, or some other percentage different from the temperature of the device 160. Thus, the temperature of the heater 140 and the temperature of the device 160 may be correlated if not approximately equal or equal.

In some embodiments, the first current source 110 and the second current source 112 may also be positioned in proximity to the heater 140 such that the heat generated by the heater 140 may affect the temperatures of the first and second current sources 110 and 112. By affecting the temperatures of the first and second current sources 110 and 112, the heater 140 may affect the magnitudes of the first and second currents generated by the first and second current sources 110 and 112, respectively. The first and second current sources 110 and 112 may also be positioned in proximity of the device 160 such that other devices in proximity to the device 160 that generate heat that may affect the temperature of the device 160 may also affect the temperature of the first and second current sources 110 and 112.

The device 160 may include any type of device that is configured to generate an output, where a value of the output is dependent on temperature. For example, the device 160 may include an optical device and the output of the device may include an electromagnetic beam. The value of the electromagnetic beam may include the wavelength of the electromagnetic beam, which may be dependent on temperature. For example, when the temperature of the device 160 increases, the wavelength of the electromagnetic beam may increase and when the temperature of the device 160 decreases, the wavelength of the electromagnetic beam may decrease.

As another example, the device 160 may include a voltage source with an output that is a voltage. The value of the voltage output by the device 160 may include a magnitude of the voltage. The device 160 may be configured such that the magnitude of the voltage may increase with an increase of temperature and the magnitude of the voltage may decrease with a decrease of temperature.

The sensor 152 may be configured to detect the value of the output of the device 160 and to provide the detected value of the output to the controller 150. For example, when the device 160 is an optical device, the sensor 152 may include a photodiode configured to detect the wavelength of an electromagnetic beam output by the optical device.

The controller 150 may be configured to receive the detected value of the output from the sensor 152. The controller 150 may also be configured to determine the first, second, and third amplification factors for the first, second, and third amplifiers 120, 122, and 130. By adjusting the first, second, and third amplification factors, the controller 150 may adjust the heat current and thus adjust the heat generated by the heater 140. By adjusting the heat generated by the heater 140, the controller 150 may control the temperature of the device 160. By controlling the temperature of the device 160, the controller 150 may control the value of the output of the device 160.

In some embodiments, the controller 150 may be configured to select magnitudes for the first, second, and third amplification factors that result in the device 160 having an output with a desired value. The controller 150 may initially select the magnitudes for the first, second, and third amplification factors and receive a detected value of the output from the sensor 152. Based on the detected value, the controller 150 may adjust a magnitude of one or more of the first, second, and third amplification factors to adjust the temperature of the device 160 to thereby adjust the value of the output of the device 160 to be approximately equal or equal to a particular value, such as the desired value. The temperature of the device 160 that results in the value of the output of the device 160 being approximately equal or equal to the particular value may be determined as a desired temperature of the device 160.

After an amount of heat applied to the device 160 from other devices (not illustrated) in the proximity of the device 160 changes, the controller 150 may again adjust the magnitudes of one or more of the first, second, and third amplification factors to adjust the heat generated by the heater 140 to thereby maintain the desired temperature of the device 160. For example, the controller 150 may again adjust one or more of the first, second, and third amplification factors to maintain the desired temperature of the device 160 such that the value of the output of the device 160 may be maintained equal or within 1%, 2%, 5%, 10%, or some other percentage of the desired value of the output of the device 160. By maintaining the desired temperature of the device 160 by adjusting one or more of the first, second, and third amplification factors, the controller 150 may also maintain a temperature surrounding the heater 140.

The magnitude of the one or more of the first, second, and third amplification factors selected by the controller 150 after heat is applied to the device 160 from other devices may also be selected such that further changes to the heat applied to the device 160 from other devices may cause the system 100 to adjust the heat generated by the heater 140 automatically, e.g., without input from the controller 150. For example, the controller 150 may be configured to adjust the one or more of the first, second, and third amplification factors such that changes in the first and second currents, resulting from changes in temperature of the first and second current sources 110 and 112, may result in changes to the heat generated by the heater 140 to approximately maintain a temperature of the device 160 at the desired temperature.

The system 100 may operate to automatically adjust the heat generated by the heater 140 based on the first and second current sources 110 and 112 being temperature dependent. Because the first and second current sources 110 and 112 are temperature dependent, changes to the heat applied to the device 160 from other devices may also affect the heat applied to the first and second current sources 110 and 112. Changing the heat applied to the first and second current sources 110 and 112 may result in changes to the magnitudes of the first and second currents. Changes to the magnitudes of the first and second currents may change the heater current such that the heater 140 may adjust an amount of heat that it generates. By adjusting the heat generated by the heater 140, the temperature of the device 160 may be approximately maintained at the desired temperature. As a result, the system 100 may compensate for further changes in heat applied to the device 160 automatically without any adjustments of the amplification factors by the controller 150. As a result, the system 100 may make the further changes to heat applied to the device 160 without relying on information from the sensor 152, such as the value of the output of the device 160 or other feedback information regarding the temperature of the device 160.

The controller 150 may be configured to determine the adjustments for the one or more of the first, second, and third amplification factors after heat is applied to the device 160 in various manners. In some embodiments, the controller 150 may calculate the adjustments for the magnitudes of the one or more of the first, second, and third amplification factors. The calculation of the adjustments may be based on a relationship between two or more of the amplification factors that is established before heat is applied to the device 160 by other devices. In some embodiments, the relationship between the two or more of the amplification factors may be based on the first and second currents generated by the first and second current sources 110 and 112, respectively, at the desired temperature before a change in heat provided by other devices and the desired temperature of the device 160.

Alternately or additionally, the controller 150 may determine the adjustments for the magnitudes of the one or more of the first, second, and third amplification factors using feedback from the sensor 152. In these and other embodiments, the controller 150 may sweep through the possible ranges of magnitudes of the one or more of the first, second, and third amplification factors and compare the detected value of the output of the device 160 to the desired value of the output of the device 160. The selected magnitudes of the one or more of the first, second, and third amplification factors that results in the detected value being approximately equal or equal to the desired value may be determined as the magnitudes of the one or more of the first, second, and third amplification factors that may be used to maintain the desired temperature of the device 160. In these and other embodiments, the controller 150 may sweep through the possible ranges of magnitudes of the two or more of the first, second, and third amplification factors while maintaining a relationship between the two or more of the amplification factors that is established before the change in heat applied to the device 160 by other devices. For example, the controller 150 may sweep through the possible ranges of magnitudes of the two or more of the first, second, and third amplification factors while maintaining a relationship between the two or more of the amplification factors that result in the device 160 having an output with a desired value before the change in heat applied to the device 160. Modifications, additions, or omissions may be made to the system 100 without departing from the scope of the present disclosure.

Figure 2A:
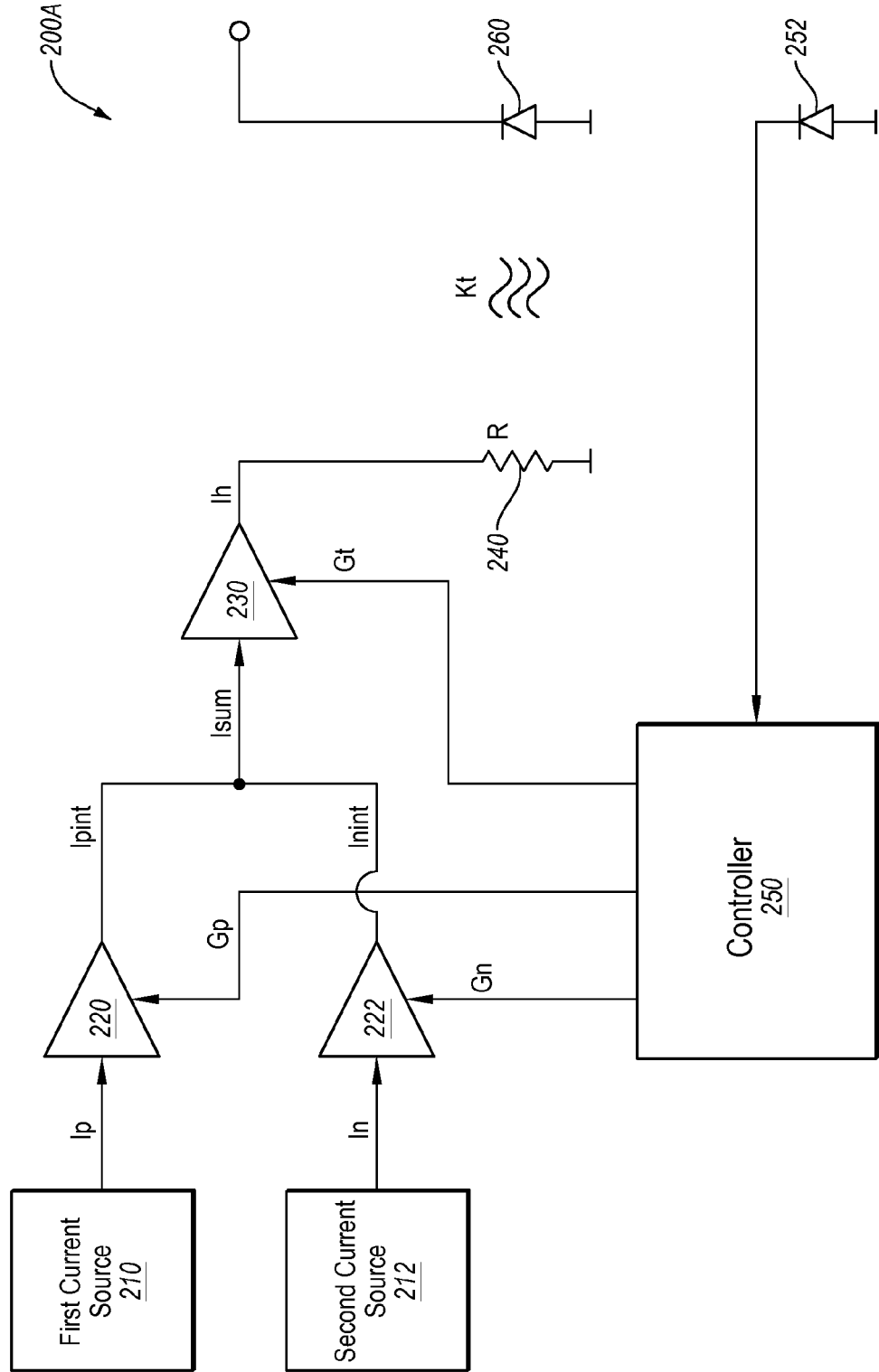
FIG. 2A illustrates another example temperature regulation system.

FIG. 2A illustrates another example temperature regulation system 200A (referred to hereinafter as "system 200A"), arranged in accordance with at least one embodiment described herein. The system 200A includes a first current source 210, a second current source 212, a first amplifier 220, a second amplifier 222, a third amplifier 230, a resistive element 240, a controller 250, a photodiode 252, and an optical modulator 260.

The first current source 210 may be configured to generate a first current Ip that is dependent on temperature and expressed by the following formula:

$$Ip(\Delta T)=Iop+Kp\Delta T$$

where Iop is the current of the first current source 210 at an initial temperature, Kp is a positively proportional-to-temperature-change coefficient of the first current source 210, and $\Delta T$ is a change in temperature from the initial temperature.

The second current source 212 may be configured to generate a second current In that is also dependent on temperature and expressed by the following formula:

$$In(\Delta T)=Ion+Kn\Delta T$$

where Ion is the current of the second current source 212 at an initial temperature, Kn is an negatively proportional-to-temperature-change coefficient of the second current source 212, and $\Delta T$ is a change in temperature from the initial temperature.

The first and second current sources 210 and 212 may provide the first and second currents Iop and Ion to the respective first and second amplifiers 220 and 222.

The first amplifier 220 may include a variable amplifier configured to apply a first amplification factor Gp to the first current Ip to generate a first intermediate current Ipint that is equal to GpIp. The magnitude of the first amplification factor Gp may be controlled by the controller 250.

The second amplifier 222 may include a variable amplifier configured to apply a second amplification factor Gn to the second current In to generate a second intermediate current Iint that is equal to GnIn. The magnitude of the second amplification factor Gn may be controlled by the controller 250.

The first and second intermediate currents Ipint and Iint may sum together to generate a third current Isum, equal to GnIn+GpIp. The third current Isum is also temperature dependent. The third current Isum may be provided to the third amplifier 230. The third amplifier 230 may include a variable amplifier configured to apply a third amplification factor Gt to the third current Isum to generate a heat current Ih that is equal to GtIsum. The magnitude of the third amplification factor Gt may be controlled by the controller 250. The heat current Ih may be provided to the resistive element 240. The heat current Ih may be expressed by the following formula:

$$Ih(\Delta T)=Gt(Gp(Iop+Kp\Delta T)+Gn(Ion+Kn\Delta T))$$

The resistive element 240 may have a resistance R that is dependent on temperature and expressed by the following formula:

$$R(\Delta T)=Ro+Kr\Delta T$$

where Ro is the resistance of the resistive element 240 at an initial temperature, Kr is a temperature coefficient of the resistive element 240, and $\Delta T$ is a change in temperature from the initial temperature. In these and other embodiments, the resistive element 240 may include a resistor or some other resistive element that generates heat when the heat current Ih output by the third amplifier 230 is provided thereto.

The heat current Ih flowing into the resistive element 240 may produce power of $Ih^2 \times R$. The power produced by the heat current Ih affects the temperature T in the area surrounding the resistive element 240, where the following formula describes the temperature T in the area surrounding the resistive element 240:

$$T=Ih^2(\Delta T) \times R(\Delta T) \times Kt$$

where Kt is a heat resistivity of a medium surrounding the resistive element 240. Expanded out, the equation for temperature T surrounding the resistive element 240 may be expressed by the following formula:

$$T=Gt^2 \times (Gp(Iop+Kp\Delta T)+Gn(Ion+Kn\Delta T))^2 \times (Ro+Kr\Delta T) \times Kt$$

When the temperature T is at the initial temperature, the change in temperature $\Delta T$ may be assumed to be zero. In this circumstance, the temperature T may be expressed by the following formula:

$$T=Gt^2 \times (GpIop+GnIon)^2 \times Ro \times Kt$$

When the temperature T is at a temperature not equal to the initial temperature and second and higher order components of the change in temperature $\Delta T$ are ignored, the temperature T may be expressed by the following formula:

$$T=(Gt^2 \times (GpIop+GnIon)^2 \times Ro \times Kt)+((Gt^2 \times Kt \times (GpIop+GnIon)) \times ((GpIop+GnIon) \times Kr) \times ((GpKp+GnKn) \times Ro))\Delta T$$

The optical modulator 260 may be located in the area surrounding the resistive element 240 and thus may be affected by heat generated by the resistive element 240. The equation for temperature T surrounding the resistive element 240 may be assumed to represent the temperature of the optical modulator 260.

The optical modulator 260 may be configured to output an electromagnetic beam with a specific wavelength. The wavelength of the electromagnetic beam may be dependent on the temperature of the optical modulator 260.

The photodiode 252 may be positioned to receive a portion of the electromagnetic beam from the optical modulator 260 and may be configured to generate an electrical current and/or a voltage that represents the wavelength of the electromagnetic beam. The photodiode 252 may be configured to provide the generated electrical current and/or voltage to the controller 250.

The controller 250 may be configured to receive the electrical current and/or voltage that represents the wavelength of the electromagnetic beam from the sensor 152. The controller 250 may also be configured to determine the magnitudes of the first, second, and third amplification factors Gp, Gn, and Gt for the first, second, and third amplifiers 220, 222, and 230, respectively. By adjusting the magnitudes of the first, second, and third amplification factors, the controller 250 may adjust the heat current and thus adjust the heat generated by the resistive element 240. By adjusting the heat generated by the resistive element 240, the controller 250 may control the temperature of the optical modulator 260. By controlling the temperature of the optical modulator 260, the controller 250 may control the value of the output of the optical modulator 260. In some embodiments, the controller 250 may be configured to adjust the magnitudes of one or more of the first, second, and third amplification factors Gp, Gn, and Gt such that changes in the first and second currents Ip and In, resulting from changes in temperature of the first and second current sources 210 and 212 may result in changes to the heat generated by the resistive element 240. The changes in heat generated by the resistive element 240 may result in maintaining an approximately equal temperature of the optical modulator 260 even when heat is applied to the optical modulator 260 by other devices.

An example of the operation of the system 200A follows. Assume that the system 200A and the optical modulator 260 are at an initial temperature. During an initial calibration phase, the controller 250 may select first and second amplification factors Gp and Gn and may send the first and second amplification factors Gp and Gn to the respective first and second amplifiers 220 and 222. The controller 250 may select the first and second amplification factors Gp and Gn randomly, based on previous amplification factors used by the system 200A, based on other calculations or other factors.

The first and second amplifiers 220 and 222 may apply the first and second amplification factors Gp and Gn to the first and second currents Ip and In generated by the first and second current sources 210 and 212 to generate first and second intermediate currents GpIp and GnIn. The first and second intermediate currents GpIp and GnIn may be combined to form the current Isum and may be provided to the third amplifier 230.

The controller 250 may also select an initial third amplification factor Gt and may provide the initial third amplification factor Gt to the third amplifier 230. The initial third amplification factor Gt may be selected randomly, based on previous amplification factors used by the system 200A, based on other calculations or other factors. The third amplifier 230 may apply the third amplification factor Gt to Isum to generate the heat current Ih that is provided to the resistive element 240. The resistive element 240 may generate a power that changes the temperature of the optical modulator 260.

The optical modulator 260 may also be generating an electromagnetic beam with an initial wavelength. The photodiode 252 may receive the electromagnetic beam and may send the electrical current and/or voltage that represents the wavelength of the electromagnetic beam to the controller 250. The controller 250 may determine the wavelength of the electromagnetic beam and may compare the determined wavelength to a desired wavelength. The desired wavelength may be determined based on the system in which the optical modulator 260 operates or based on some other factors.

When the determined wavelength is not equal to the desired wavelength, the controller 250 may adjust the third amplification factor Gt to increase or decrease the heat current Ih to thereby adjust the temperature of the optical modulator 260. The controller 250 may continue to monitor the wavelength of the electromagnetic beam and to adjust the third amplification factor Gt until the wavelength of the electromagnetic beam approximately equals or equals the desired wavelength. The third amplification factor Gt that results in the wavelength of the electromagnetic beam being approximately equal or equal to the desired wavelength may be referred to as the final third amplification factor Gt. After the wavelength of the electromagnetic beam approximately equals or equals the desired wavelength, the initial calibration phase of the system 200A may be completed.

The temperature T of the optical modulator 260 after the initial calibration phase, e.g., when the electromagnetic beam approximately equals or equals the desired wavelength, may be referred to as the desired temperature and expressed by the following formula:

$$T = Gt^2 \times (GpIop + GnIon)^2 \times Ro \times Kt$$

With respect to the above formula, during the initial calibration phase, the third amplification factor Gt may be varied, while the first and second amplification factors Gp and Gn remain constant.

In some embodiments, using the first and second amplification factors Gp and Gn initially selected, the third amplifier 230 may not have an amplification range sufficient to adjust the heat current Ih to cause the wavelength of the electromagnetic beam to be approximately equal or equal to the desired wavelength. In these and other embodiments, the controller 250 may adjust the first and second amplification factors Gp and Gn and then adjust the third amplification factor Gt as described until a combination of first, second, and third amplification factors Gp, Gn, and Gt may be determined that causes the wavelength of the electromagnetic beam to be approximately equal or equal to the desired wavelength.

After the initial calibration phase, heat applied to the optical modulator 260 by one or more devices proximate to the optical modulator 260 may be increased or reduced resulting in the temperature of the optical modulator 260 varying from the desired temperature. The devices proximate the optical modulator 260 may be devices with a primary operation to heat the optical modulator 260. Alternately or additionally, the devices may generate heat during their operation. In these and other embodiments, heat generation may not be the primary operation of the devices, but merely a byproduct of the primary operation of the devices. For example, the devices may be processors, analog to digital converters, digital to analog converters, amplifiers, some other digital or analog device, or some combination of different devices that generates heat during operation. The heat applied to the optical modulator 260 may also affect the temperature of the first and second current sources 210 and 212, causing the first and second currents Ip and In to change.

After the temperature of the optical modulator 260 varies from the desired temperature, the system 200A may perform a secondary calibration phase to bring the temperature of the optical modulator 260 back to the desired temperature. In some embodiments, the secondary calibration phase may occur after the temperature varies and stabilizes at a temperature different from the desired temperature. In some embodiments, the controller 250 may determine to begin the secondary calibration phase based on the wavelength of the electromagnetic beam not equaling or not being approximately equal to the desired wavelength due to the change in temperature of the optical modulator 260.

During the secondary calibration phase, the controller 250 may maintain the third amplification factor Gt at the magnitude of the final third amplification factor Gt determined during the initial calibration phase. The controller 250 may adjust the first and second amplification factors Gp and Gn such that the wavelength of the electromagnetic beam again becomes approximately equal or equal to the desired wavelength.

The controller 250 may select the adjustments for the first and second amplification factors Gp and Gn such that additional temperature changes to the optical modulator 260 may result in changes to the heat generated by the resistive element 240 to maintain the temperature of the optical modulator 260 at the desired temperature. For example, the adjustments for the first and second amplification factors Gp and Gn may be such that changes in the first and second currents Ip and In due to changes in temperature of the first and second current sources 210 and 212 caused by the other devices changes the heat current Ih. The heat current Ih may be changed in a manner that the heat generated by the resistive element 240 compensates for the changes in heat applied by the other devices to maintain the temperature of the optical modulator 260 at the desired temperature.

As noted above, the temperature T of the optical modulator 260 after heat is applied by the other devices is described by the following equation:

$$T = (Gt^2 \times (GpIop + GnIon)^2 \times Ro \times Kt) + ((Gt^2 \times Kt \times (GpIop + GnIon)) \times ((GpIop + GnIon) \times Kr) \times ((GpKp + GnKn) \times Ro)) \times T$$

During the secondary calibration phase, the controller 250 may be configured to adjust the first and second amplification factors Gp and Gn such that the first order term of ΔT becomes zero. By causing the first order term of ΔT to become zero, the controller 250 may cause the system 200A to automatically compensate for further changes in the temperature as described above. For example, by causing the first order term of ΔT to become zero, the equation for the temperature T, while setting the higher order terms of ΔT to zero because they may be ignored, may be described by the following equation:

$$T=(Gt^2 \times (GpIop+GnIon)^2 \times Ro \times Kt)$$

As a result, the temperature T may not be affected by changes in temperature and may be equal to the equation for the desired temperature determined during the initial calibration phase. Thus, to maintain the temperature of the optical modulator 260 at the desired temperature, the controller 250 may select the adjustments for the first and second amplification factors Gp and Gn to maintain the relationship between the first and second amplification factors Gp and Gn established during the initial calibration phase. In particular, the controller 250 may maintain the relationship such that the term (GpIop+GnIon) from the equation for the desired temperature of the optical modulator 260 remains constant.

By maintaining the term (GpIop+GnIon) constant during the secondary calibration phase and not adjusting the third amplification factor Gt, the temperature after the secondary calibration phase may maintain at the desired temperature. As a result, the wavelength of the electromagnetic beam may be approximately equal or equal to the desired wavelength. Furthermore, the system 200A may be configured to continue to adjust the heat generated by the resistive element 240 based on changes to heat applied by the other devices to maintain the optical modulator 260 at the desired temperature without the controller 250 adjusting the first, second, or third amplification factors Gp, Gn, and Gt or other aspects of the system 200A.

In some embodiments, the first, second, or third amplification factors Gp, Gn, and Gt selected during the initial calibration phase may not allow for the second and third amplification factors Gp and Gn to be adjusted to cause the first order term of ΔT to become zero. In these and other embodiments, the initial calibration phase may be performed again with different first and second amplification factors Gp and Gn to select a different final third amplification factor Gt followed by the secondary calibration phase to adjust the first and second amplification factors Gp and Gn.

In some embodiments, the controller 250 may determine the adjustments for the second and third amplification factors Gp and Gn by calculating the adjustments using the above formulas. Alternately, the controller 250 may determine the adjustments for the second and third amplification factors Gp and Gn by sweeping through the second and third amplification factors Gp and Gn in a manner that maintains the term (GpIop+GnIon) constant while monitoring the wavelength information from the photodiode 252. When the wavelength information from the photodiode 252 indicates that the wavelength of the electromagnetic beam is the desired wavelength, the second and third amplification factors Gp and Gn at that time may be the second and third amplification factors Gp and Gn to cause the first order term of ΔT to become zero. Modifications, additions, or omissions may be made to the system 200A without departing from the scope of the present disclosure.

Figure 2B:
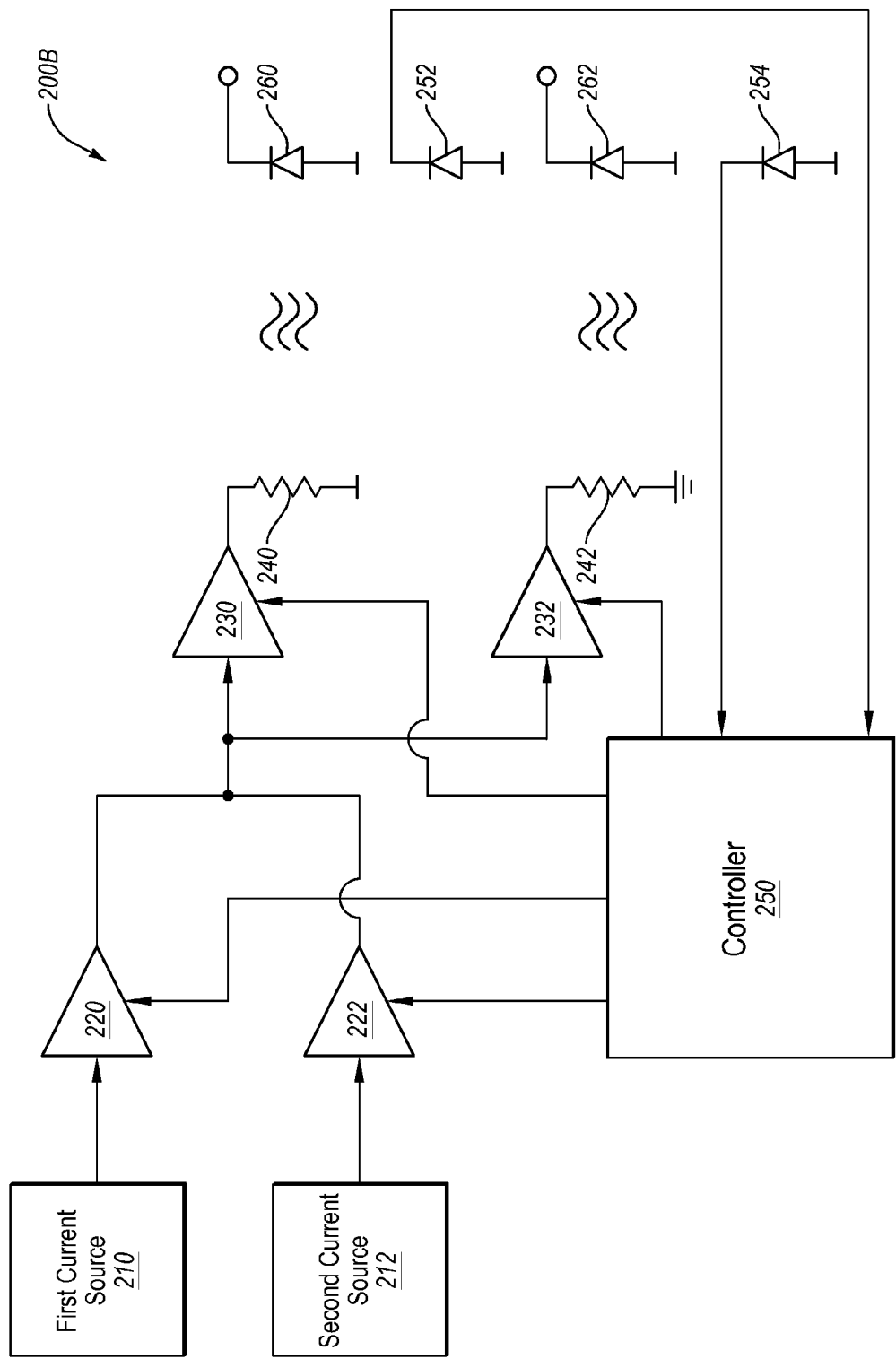
FIG. 2B illustrates another example temperature regulation system.

FIG. 2B illustrates another example temperature regulation system 200B (referred to as the "system 200B"), arranged in accordance with at least one embodiment described herein. The system 200B includes the system 200A and a fourth amplifier 232, a second resistive element 242, a second optical modulator 262, and a second photodiode 254.

The fourth amplifier 232, the second resistive element 242, the second optical modulator 262, and the second photodiode 254 may be analogous in operation to the third amplifier 230, the resistive element 240, the photodiode 252, and the optical modulator 260, respectively, of the system 200A of FIG. 2A.

The fourth amplifier 232 may be configured to apply a fourth amplification factor to the third current Isum to generate a second heat current that is provided to the second resistive element 242. The controller 250 may be configured to adjust the fourth amplification factor applied by the fourth amplifier 232 to the third current Isum. The second resistive element 242 may receive the second heat current and generate heat that may be used to heat the second optical modulator 262. During the initial calibration phase, the controller 250 may be configured to adjust the fourth amplification factor based on wavelength information from the second photodiode 254 regarding the wavelength of an electromagnetic beam output by the second optical modulator 262. During the secondary calibration phase, the controller 250 may use wavelength information from either the photodiode 252 or the second photodiode 254 or an equation based on either the photodiode 252 or the second photodiode 254 to adjust the first and second amplification factors.

Figure 3:
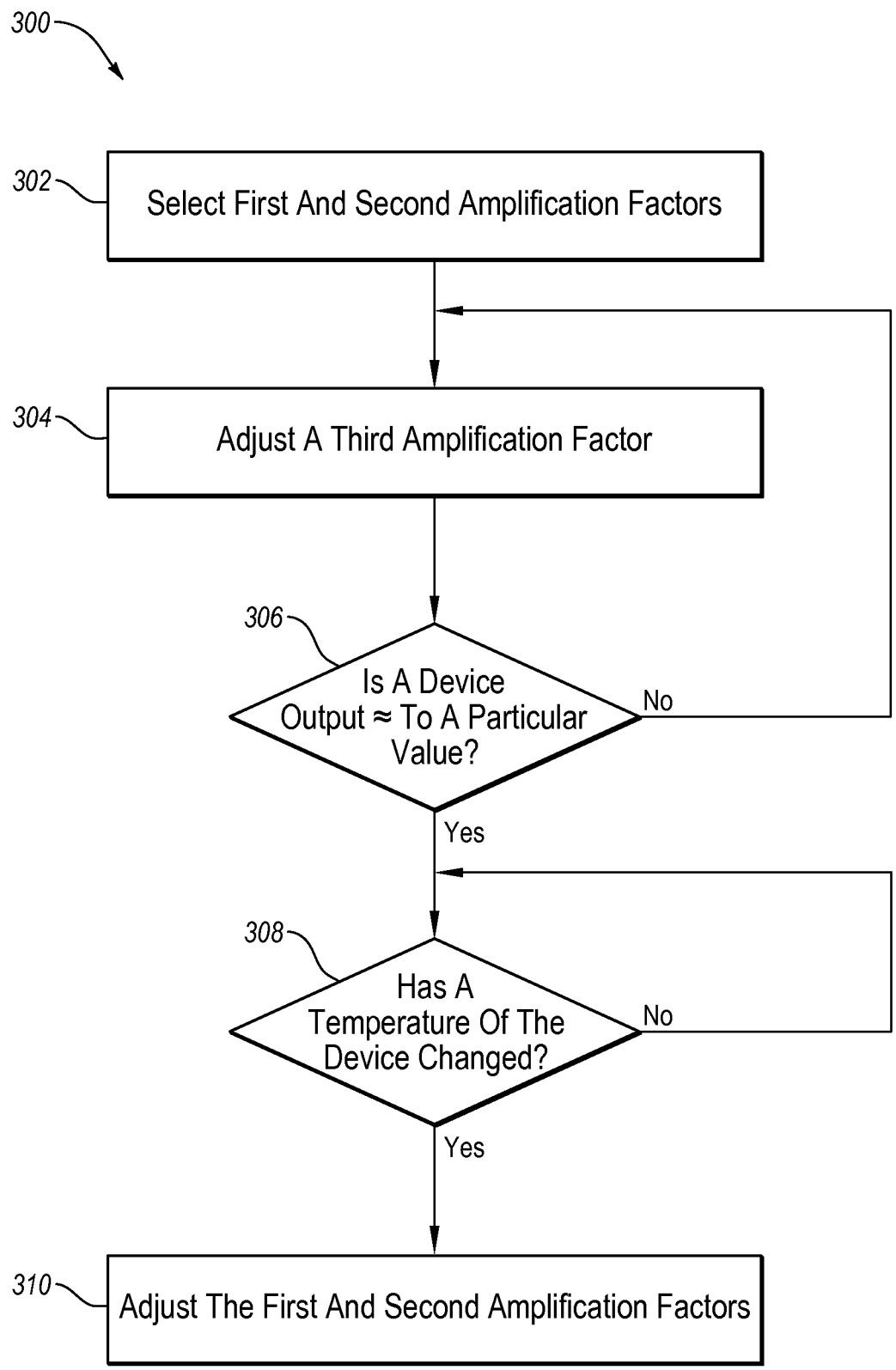
FIG. 3 is a flowchart of an example method of regulating a temperature of a device.

FIG. 3 is a flowchart of an example method 300 of regulating a temperature of a device, arranged in accordance with at least one embodiment described herein. The method 300 may be implemented, in some embodiments, by a temperature regulation system, such as the temperature regulation systems 100, 200A, 200B, or 410 of FIGS. 1, 2A, 2B, and 4. Although illustrated as discrete blocks, various blocks may be divided into additional blocks, combined into fewer blocks, or eliminated, depending on the desired implementation.

The method 300 may begin at block 302, where first and second amplification factors may be selected. The first and second amplification factors may be amplification factors that are applied to first and second currents, respectively, generated by two temperature-dependent current sources. The first and second amplification factors may be randomly selected or based on previous amplification factors used by the temperature regulation system performing the method 300. The first and second amplification factors may be applied to the first and second currents to generate first and second intermediate currents.

In block 304, a third amplification factor may be adjusted. The third amplification factor may be an amplification applied to a combination of the first and second intermediate currents. The amplified combination of the first and second intermediate currents may be used to generate heat to adjust a temperature of a device that generates an output with a value that is dependent on the temperature of the device.

In block 306, it may be determined if the output of the device is equal or approximately equal to a particular value. The particular value may be a desired value for the output of the device. When the device output is equal or approximately equal to the desired value, the method 300 may proceed to block 308. When the device output is not equal or not approximately equal to the desired value, the method 300 may return to block 304.

In block 308, it may be determined if a temperature of the device has changed. In some embodiments, it may be determined if the temperature of the device has changed and stabilized. In some embodiments, it may be determined if the temperature of the device has changed based on changes to the value of the output of the device. When the temperature of the device has changed, the method 300 may proceed to block 310. When the temperature of the device has not changed, the method 300 may return to block 308.

In block 310, the first and second amplification factors may be adjusted. In some embodiments, the first and second amplification factors may be adjusted based on a relationship between the first and second amplification factors selected in block 302 and the first and second currents to which the first and second amplification factors are applied.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 300 may further include determining if the first and second amplification factors may be adjusted such that the device output may be equal or approximately equal to the particular value. When the first and second amplification factors may not be adjusted such that the device output may be equal to or approximately equal to the particular value, the method 300 may begin again at block 302.

Figure 4:
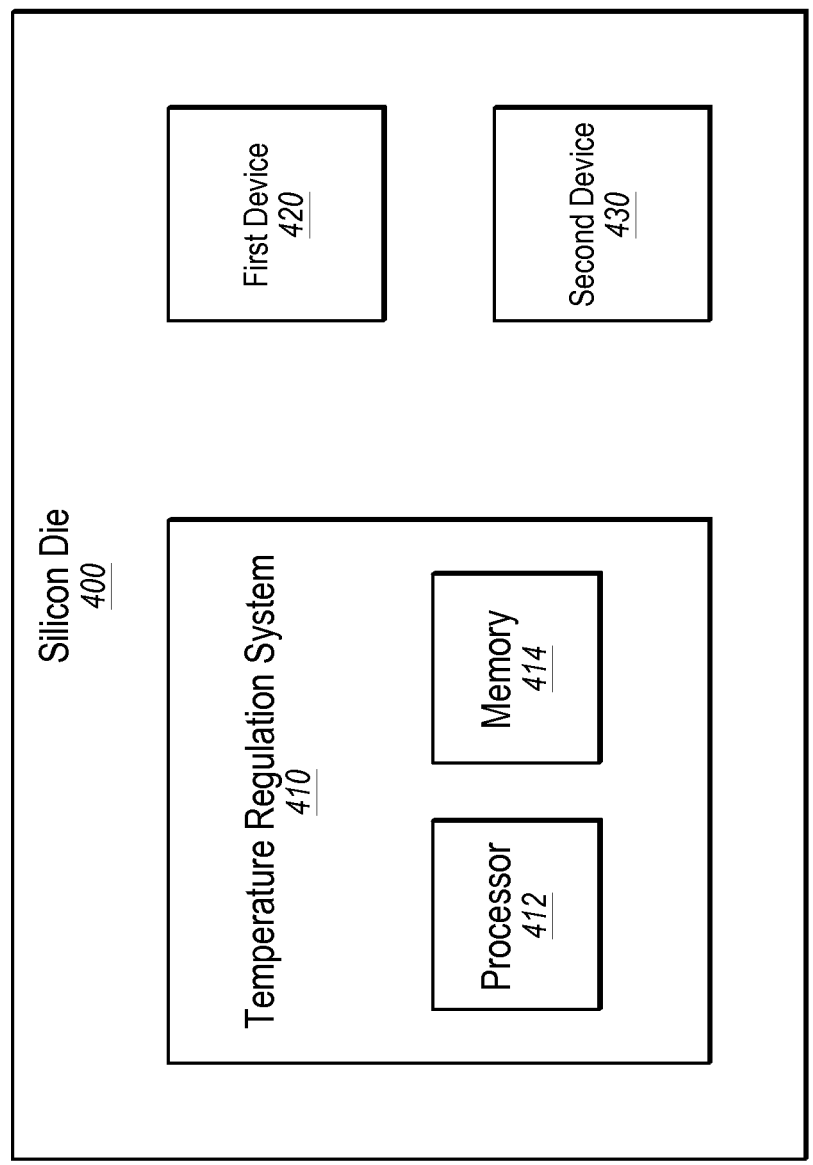
FIG. 4 illustrates a silicon die with an example temperature regulation system formed thereon.

FIG. 4 illustrates a silicon die 400 with an example temperature regulation system 410 formed thereon, arranged in accordance with at least one embodiment described herein. The silicon die 400 may also include a first device 420 and a second device 430 formed thereon. The first device 420 may be a device that is configured to generate an output with a value that is temperature dependent. The second device 430 may be a device with an operation related to the operation of the system that includes the silicon die 400. The second device 430 may generate heat during its operation that affects the temperature of the first device 420.

The temperature regulation system 410 may be configured to adjust the temperature of the first device 420 to a desired temperature such that the output of the first device 420 has a value that is equal to or approximately equal to a particular value, such as a desired value for operation of the system that includes the silicon die 400. The temperature regulation system 410 may adjust the temperature of the first device 420 to a desired temperature during an initial calibration phase by adjusting an internal setting, such as an amplification factor. After a period, during which the operation of the second device 430 affects the temperature of the first device 420, the temperature regulation system 410 may adjust the temperature to the desired temperature by adjusting an internal setting, such as an amplification factor during a secondary calibration phase. After the secondary calibration phase, the temperature regulation system 410 may be configured to compensate for additional changes in the temperature of the first device 420 due to changes caused by the second device 430 automatically without adjusting internal settings.

In some embodiments, the functionality of the temperature regulation system 410 may be performed or controlled by a processor 412 and a memory 414 included in the temperature regulation system 410. The processor 412 may include, for example, a microprocessor, a microcontroller, a digital signal processor ("DSP"), an application-specific integrated circuit ("ASIC"), a Field-Programmable Gate Array ("FPGA"), or any other digital or analog circuitry configured to interpret and/or to execute program instructions and/or to process data. In some embodiments, the processor 412 may interpret and/or execute program instructions and/or process data stored in the associated memory 414. Although a single processor 412 is illustrated in FIG. 1, the temperature regulation system 410 may include multiple processors 412.

The memory 414 may include any suitable computer-readable media configured to retain program instructions and/or data for a period of time. By way of example, and not limitation, such computer-readable media may include tangible and/or non-transitory computer-readable storage media, including Random Access Memory ("RAM"), Read-Only Memory ("ROM"), Electrically Erasable Programmable Read-Only Memory ("EEPROM"), Compact Disk Read-Only Memory ("CD-ROM") or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by the processor 412. Combinations of the above may also be included within the scope of computer-readable media. Computer-executable instructions may include, for example, instructions and data that cause a general-purpose computer, special-purpose computer, or special-purpose processing device (e.g., the processor 412) to perform a certain function or group of functions.

Modifications, additions, or omissions may be made to the silicon die 400 without departing from the scope of the present disclosure. For example, in some embodiments, the silicon die 400 may include multiple other devices that generate heat as a byproduct of the intended operation. As another example, the temperature regulation system 410 may not include the processor 412 and the memory 414, but the functionality of the temperature regulation system 410 may be implemented using analog circuitry. Alternately or additionally, the functionality of the temperature regulation system 410 may be implemented using a combination of analog and digital circuitry and/or other hardware. For example, the hardware may include an application-specific integrated circuit (ASIC) or a field-programmable gate array (FPGA) that is configured to execute operations to provide the functionality of the temperature regulation system 410.

Figure 5:
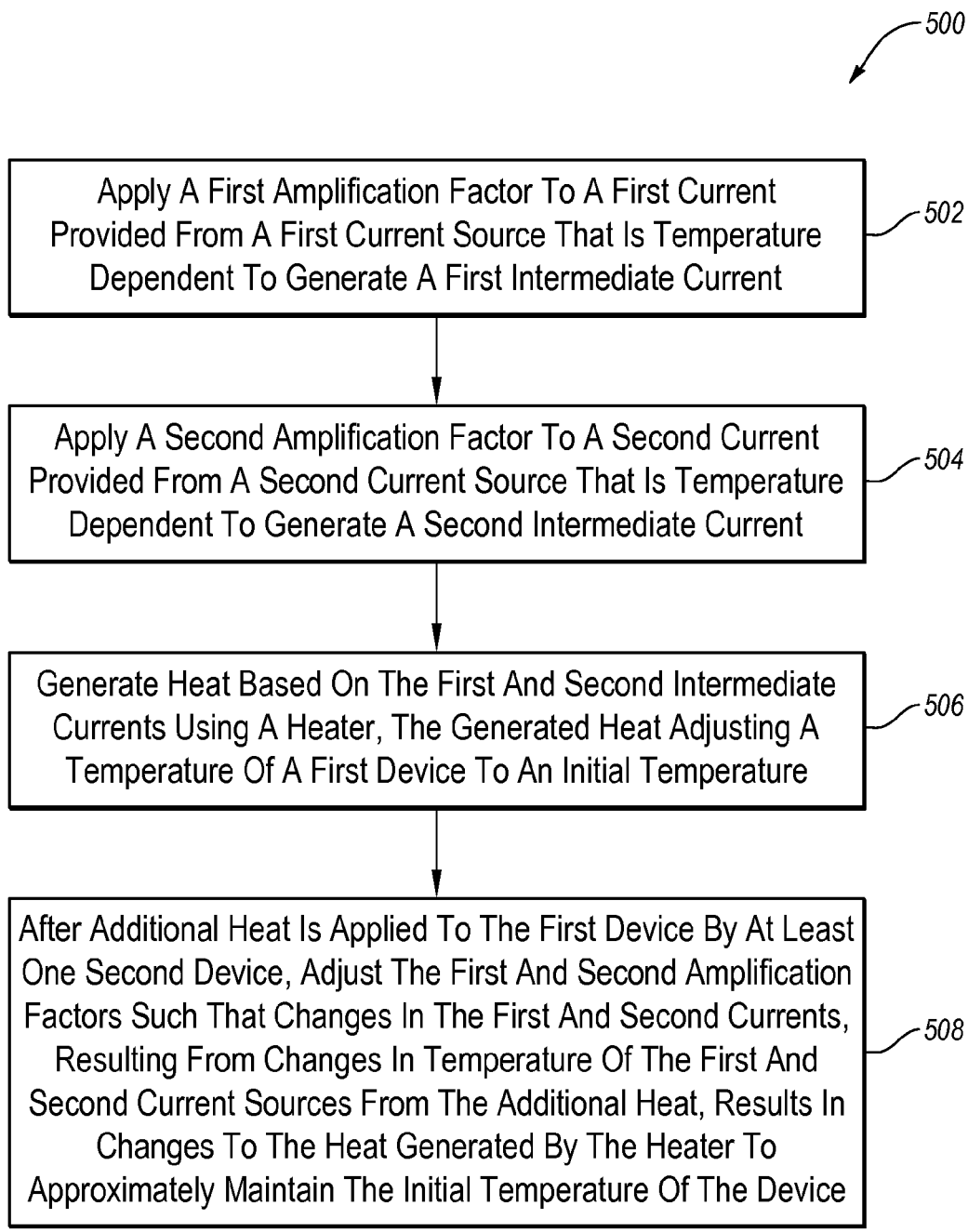
FIG. 5 is a flowchart of another example method of regulating a temperature of a device.

FIG. 5 is a flowchart of an example method 500 of regulating a temperature of a device, arranged in accordance with at least one embodiment described herein. The method 500 may be implemented, in some embodiments, by a temperature regulation system, such as the temperature regulation systems 100, 200A, 200B, or 410 of FIGS. 1, 2A, 2B, and 4, respectively. Although illustrated as discrete blocks, various blocks may be divided into additional blocks, combined into fewer blocks, or eliminated, depending on the desired implementation.

The method 500 may begin at block 502, where a first amplification factor may be applied to a first current provided from a first current source that is temperature dependent to generate a first intermediate current. In some embodiments, the first current source may be temperature dependent such that the first current may be positively proportional to temperature change.

In block 504, a second amplification factor may be applied to a second current provided from a second current source that is temperature dependent to generate a second intermediate current. In some embodiments, the second current source may be temperature dependent such that the second current may be negatively proportional to temperature change.

In block 506, heat may be generated based on the first and second intermediate currents using a heater. The generated heat may adjust a temperature of a first device to an initial temperature.

In block 508, after additional heat is applied to the first device by at least one second device, the first and second amplification factors may be adjusted such that changes in the first and second currents, resulting from changes in temperature of the first and second current sources from the additional heat, may result in changes to the heat generated by the heater to approximately maintain the initial temperature of the device.

In some embodiments, the method 500 may further include adjusting the first amplification factor and the second amplification factor based on an output of the first device before the additional heat is applied to the first device. In these and other embodiments, the first amplification factor and the second amplification factor may be adjusted to adjust the heat generated by the heater until the first device generates an output at a particular value. The first device may generate the output at the particular value when the heat generated by the heater results in the first device being at the initial temperature.

In some embodiments, the method 500 may further include calculating the adjustment to the first and second amplification factors to approximately maintain the initial temperature of the device after additional heat is applied to the first device by the at least one second device. In these and other embodiments, the adjustment to the first and second amplification factors may be calculated based on maintaining a relationship between the first and second amplification factors that is established before the additional heat is applied to the first device by the at least one second device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All examples and conditional language recited herein are intended as pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A temperature regulation system, comprising:
a first current source configured to generate a first current that is positively proportional to temperature change;
a second current source configured to generate a second current that is negatively proportional to temperature change;
a first amplifier configured to apply a first amplification factor to the first current to generate a first intermediate current;
a second amplifier configured to apply a second amplification factor to the second current to generate a second intermediate current;
a third amplifier configured to output a heat current based on a sum of the first and second intermediate currents;
a resistive element configured to generate heat based on the heat current; and
a controller configured to adjust the first and second amplification factors to adjust the heat generated by the resistive element such that changes in the first and second currents result in changes to the heat generated by the resistive element to maintain an approximately equal temperature of an area surrounding a first device.

2. The temperature regulation system of claim 1, wherein the controller is further configured to adjust a third amplification factor of the third amplifier to adjust the heat generated by the resistive element.

3. The temperature regulation system of claim 1, wherein the controller is further configured to calculate the first and second amplification factors to maintain the approximately equal temperature of the area surrounding the first device after heat is provided to the area surrounding the first device by the first device.

4. The temperature regulation system of claim 3, wherein the controller is further configured to calculate the adjustment to the first and second amplification factors to maintain the approximately equal temperature of the area surrounding the first device based on maintaining a relationship between the first and second amplification factors that is established before heat is provided to the area surrounding the first device by the first device.

5. The temperature regulation system of claim 4, wherein the relationship between the first and second amplification factors that is established before heat is provided to the area surrounding the first device is based on the first and second currents at the approximately equal temperature.

6. The temperature regulation system of claim 1, wherein the temperature regulation system is included in a system that additionally includes a second device configured to generate an output, a value of the output being dependent on a temperature of the second device, wherein the temperature regulation system further comprises a sensor configured to detect the value of the output of the second device, wherein the controller is further configured to adjust the first and second amplification factors until the detected value is approximately equal to a particular value.

7. The system of claim 6, wherein the second device is an optical device, the output is an electromagnetic beam, and the value is a wavelength of the electromagnetic beam.

8. A system comprising:
a device configured to generate an output, a value of the output being dependent on a temperature of the device; and
a temperature regulation system configured to regulate a temperature of the device, the temperature regulation system comprising:
a first current source that is temperature dependent and is configured to generate a first current;
a second current source that is temperature dependent and is configured to generate a second current;
a first amplifier configured to apply a first amplification factor to the first current to generate a first intermediate current;
a second amplifier configured to apply a second amplification factor to the second current to generate a second intermediate current;

a third amplifier configured to output a heat current based on a sum of the first and second intermediate currents;

a heater configured to generate heat based on the heat current and positioned such that the generated heat affects the value of the output of the device; and a controller configured to adjust the first and second amplification factors such that changes in the first and second currents, resulting from changes in temperature of the first and second current sources, results in changes to the heat generated by the heater to maintain an approximately equal temperature of the device.

9. The system of claim 8, wherein the first current is positively proportional to temperature change and the second current is negatively proportional to temperature change.

10. The system of claim 9, wherein the controller is further configured to adjust a third amplification factor of the third amplifier to adjust the temperature surrounding the heater.

11. The system of claim 8, wherein the temperature regulation system further includes a sensor configured to detect the value of the output of the device, wherein the controller is configured to adjust the first and second amplification factors until the value detected by the sensor is approximately equal to a particular value.

12. The system of claim 8, wherein the controller is further configured to calculate the adjustment to the first and second amplification factors to maintain the approximately equal temperature of the device after heat is provided to an area surrounding the device by a second device.

13. The system of claim 12, wherein the controller is configured to calculate the adjustment to the first and second amplification factors to maintain the approximately equal temperature of the device based on maintaining a relationship between the first and second amplification factors that is established before heat is provided to the area surrounding the device by the second device.

* * * * *